Sept. 27, 1960 H. W. MOORE 2,953,923
BALANCING MACHINE
Filed Nov. 21, 1955 2 Sheets-Sheet 1

INVENTOR.
Harry W. Moore
BY
HIS ATTORNEYS

Sept. 27, 1960   H. W. MOORE   2,953,923
BALANCING MACHINE
Filed Nov. 21, 1955   2 Sheets-Sheet 2

INVENTOR.
Harry W. Moore
BY
HIS ATTORNEYS

2,953,923

Patented Sept. 27, 1960

2,953,923

BALANCING MACHINE

Harry W. Moore, 3710 Tangier Trail, Sarasota, Fla.

Filed Nov. 21, 1955, Ser. No. 547,942

2 Claims. (Cl. 73—466)

This invention relates to improvements in a dynamic balancing apparatus and more particularly to the use of a stroboscopic light assembly in combination with the balancing apparatus, although not necessarily so limited.

The dynamic balancing apparatus of this invention is utilized to balance a body for rotation about a particular axis. The object of the balancing operation is to adjust the distribution of the mass of the body so that the center of mass lies on the axis of rotation. Only then is the body balanced for rotation about the particular axis of rotation. When the center of mass does not lie on the axis of rotation, unbalanced centrifugal forces are created which are transmitted to the support upon which the body rotates, forcing the support to vibrate. Usually these vibrations are objectionable and injurious to any machinery associated with the rotating body.

The present balancing apparatus is designed specifically to balance a mass distributed upon a shaft, it being desired to balance the combined mass and shaft for rotation about the geometric axis of the shaft. In principle, the balancing apparatus rotates the combined mass and shaft at high speeds upon yielding supports. When the rotational velocity of the test body is sufficiently high, the test body rotates about its center of mass and, when the center of mass does not lie on the geometric axis of the shaft of the test body, the yielding supports are forced to vibrate to accommodate the eccentric motion of the shaft.

The vibratory motion of the yielding supports is then analyzed to determine what correction in mass distribution would be required to balance the body for rotation about its geometric axis.

An object of this invention is to provide improved means for determining the corrections to be applied to a rotatable body so as to balance the body for rotation about a particular axis.

Another object of this invention is to provide means for identifying the portion of the body to which mass is to be added or from which mass is to be removed for balancing the body for rotation.

Other objects and advantages reside in the construction of parts, the combination thereof and the mode of operation, as will become more apparent from the following description.

In the drawings, Figure 1 is a front elevational view of the dynamic balancing apparatus of this invention.

Figure 1:
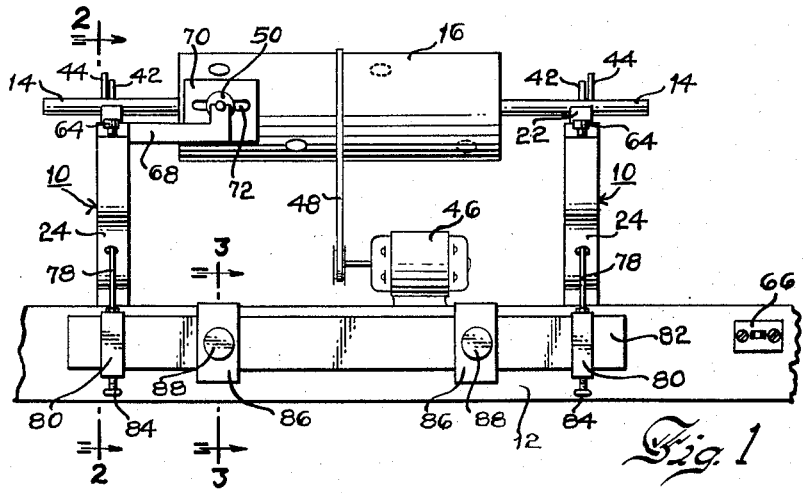
Figure 2:
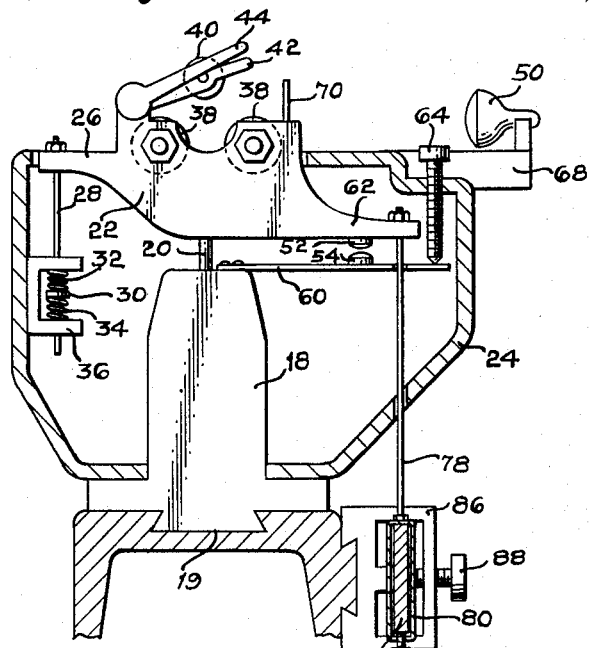
Figure 2 is an enlarged sectional view taken substantially along the line 2—2 of Figure 1, with parts broken away.
Figure 3:
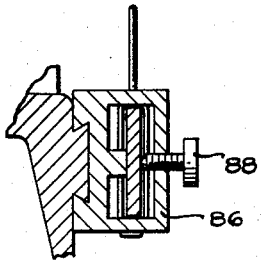
Figure 3 is an enlarged sectional view taken substantially along the line 3—3 of Figure 1, with parts broken away.
Figure 4:
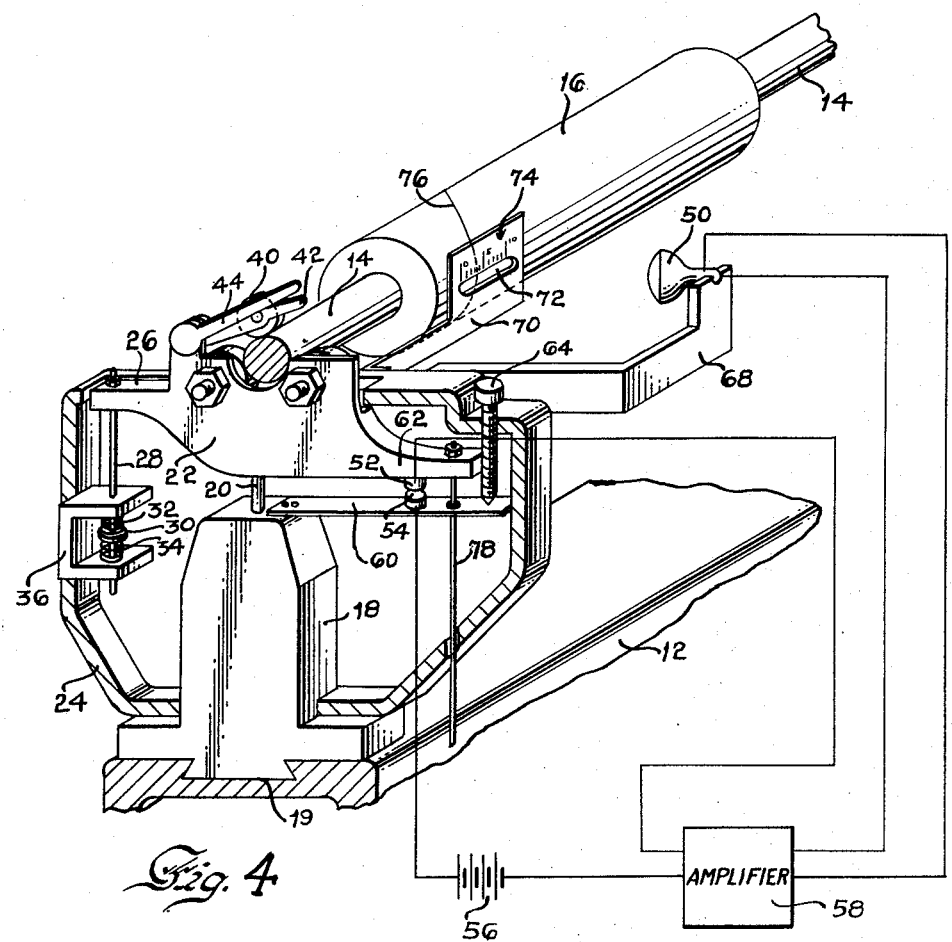
Figure 4 is an enlarged perspective view of one end of the dynamic balancing apparatus, with parts broken away, showing the electrical circuit for a stroboscopic light assembly actuated by the balancing apparatus.

Referring to the drawings in detail, the balancing apparatus of this invention includes a pair of vibratory or yielding supports 10 mounted upon a base 12. The supports 10 are designed for supporting the ends of a shaft 14 carrying a mass 16 which together represent the body which is to be balanced for rotation. In typical applications, the mass 16 may be a motor armature or a centrifugal impeller, or the like.

Each vibratory support 10 includes an upright post 18 rigidly attached to the base 12. The separation between the upright posts 18 is adjustable by sliding the posts along a track 19 in the base 12. Projecting upwardly from each post 18 is a vibratory reed 20 which supports a mounting head 22. The vibratory reed 20 provides a resilient or yielding bond between the mounting head 22 and the post 18.

Partially enclosing each vibratory support 10 is a frame member 24 which is rigidly secured to the upright post 18. The frame member 24 does not contact the mounting head 22 which is free to execute a vibratory or oscillatory motion.

If either mounting head 22 is displaced from its equilibrium position upon the reed 20, then released, it will vibrate with simple harmonic motion. The frequency of this vibration is termed the natural frequency and is determined by the structural properties of the vibratory reed 20 and the mass of the mounting head 22. For reasons which will be apparent later, it is desirable to eliminate or damp this natural vibration frequency.

Accordingly, each mounting head 22 is provided with a laterally extending arm 26 from which depends a shaft 28 carrying a cylindrical disc 30 adjacent the lower end thereof. Vertical motion of the shaft 28 is restrained by a pair of opposing springs 32 and 34 acting upon the disc 30. The springs 32 and 34 are supported by a U-shaped member 36 secured to the frame member 24. The function of the springs 32 and 34 of each vibratory support 10 is to damp the oscillatory motion of the mounting heads 22.

Each mounting head 22 supports a pair of roller bearings 38 which provide a self-aligning support for the shaft 14. A third roller bearing 40 carried by an arm 42 pivotally connected to each mounting head 22 is pivoted into contact with the shaft 14. Each roller bearing 40 is locked against the shaft 14 by a locking arm 44 threadedly connected to each arm 42, the arms 44 being turned so as to draw the arms 42 tightly against the mounting heads 22. The shaft 14, carrying the mass 16 which is to be balanced, can be thus rotatably secured to the mounting heads 22.

The mass 16 and shaft 14 are rotated by a motor 46 mounted thereunder upon the base 12. It is important that the motor 46 neither impresses an artificial vibration upon the mass 16, nor restricts any vibration of the mass 16 and for this reason a driving belt 48 is employed to connect the motor 46 to the mass 16. The shaft 14 and mass 16 are thus supported for rotation by the vibratory supports 10 and the shaft 14 is constrained to rotate about its geometric axis. If the center of mass of the shaft 14 combined with the mass 16 does not lie on the geometric axis of the shaft 14, an unbalanced condition is created. That is, the shaft 14 and mass 16 tend to rotate about their common center of mass, but, instead, are constrained to rotate about the geometric axis of the shaft 14.

When the rotational velocity of the combined mass 16 and shaft 14 is comparatively low, the center of mass will execute an orbital motion about the geometric axis of revolution of the shaft 14. The centrifugal forces created by this orbital motion will impress a vibration upon the vibratory reeds 20. With increasing rotational velocities, the axis of rotation will shift from the geometric axis of revolution to a new axis of revolution passing through the center of mass. When this occurs, the combined mass 16 and shaft 14 will execute pure rotational motion about the center of mass, the motion of the shaft 14 being eccentric. To accommodate this new motion, the phase of vibration of the vibratory reeds 20 must shift 180°. The rotational velocity at which this phase shift occurs is frequently termed the critical speed. The net result when the rotational velocity is above the critical speed is that each mounting head 22 vibrates to accommodate an eccentric motion of the shaft 14. The frequency of vibration of the mounting heads 22 will equal numerically the rotational velocity of the shaft 14.

Thus far, an apparatus for revealing an unbalanced condition in the combined shaft 14 and the mass 16 has been described. In the following, means for analyzing and for correcting this unbalanced condition will be described. In the description which follows it is assumed that the shaft 14 is substantially uniform and that, therefore, the center of mass of the combined shaft 14 and mass 16 is located somewhere within the mass 16.

To correct for the unbalanced condition, it is sufficient to locate the angular position of the center of mass with respect to the geometric axis of the shaft 14, then either to remove appropriate amounts of material from the peripheral ends of the mass 16 at this same angular position, or to add appropriate weights to the peripheral ends of the mass 16 on the side opposite the center of mass. This is, of course, merely one of many methods for balancing a body for rotation.

In analyzing the unbalanced condition of the shaft 14 and mass 16, two measurements are made. First, the angular position of the center of mass is determined. Second, the appropriate weights to be added or removed from each end of the mass 16 at the perimeter is determined.

The angular position of the center of mass is determined through the use of a stroboscopic light assembly. The light assembly includes a gas filled lamp 50 which is turned off and on by a set of contacts 52 and 54. In order to avoid placing the full lamp voltage across the contacts 52 and 54, the contacts are placed in series with a small voltage supply 56 in the grid control circuit of an amplifier 58. The lamp 50 is thus energized through an amplifier, the output of which is regulated by the contacts 52 and 54. The operation of the amplifier 58 is such that the lamp 50 is energized to glow each time the contacts 52 and 54 come together.

One set of contacts 52 and 54 is placed on each vibratory support 10. Each contact 52 is placed upon a laterally extending arm 62 integral with each mounting head 22. Each contact 54 is placed upon a laterally extending flexible strap 60 attached to each upright post 18. Adjustment screws 64 threadedly engaging each frame member 24 and bearing upon each flexible strap 60 permit adjustment of the separation between the contacts 52 and 54.

A switch 66 mounted upon the base 12 is provided for connecting the stroboscopic light assembly to either set of contacts 52 and 54 on either vibratory support 10.

The lamp 50 is mounted upon a bracket 68 attached to one frame member 24 and is positioned to illuminate the rotating mass 16. Interposed between the lamp 50 and the mass 16 is a shield 70 which may be attached to either frame member 24. A longitudinal slot 72 in the shield 70 permits light from the lamp 50 to pass through the shield to illuminate the mass 16. A graduated scale 74 is provided on the shield 70 adjacent the slot 72 and a helical mark 76 which may be a solid or broken line is placed on the mass 16, the helical mark having a pitch substantially equal to the length of the slot 72.

When the unbalanced mass 16 is rotated about its center of mass upon the vibratory supports 10, the mounting heads 22 will vibrate, making and breaking both sets of contacts 52 and 54, when the contacts are properly spaced. This causes the lamp 50 to flash once for each revolution of the mass 16 no matter which set of contacts 52 and 54 is connected to the lamp 50. Hence, the mass 16 will be illuminated by the lamp 50 once each revolution and, what is more, the same portion of the mass 16 will be illuminated once each revolution. This creates a stroboscopic effect, whereby, to an observer, the mass 16 appears not to be rotating. The portion of the mass 16 which is illuminated each cycle bears a fixed angular relationship to the center of mass. The portion illuminated can be readily identified by observing through the slot 72 the position of the helical mark 76 with respect to the graduated scale 74.

The angular relationship between the portion of the mass 16 identified with the stroboscopic light and the center of mass can be determined experimentally and, once determined, will be substantially constant for all rotating bodies tested on each particular balancing apparatus. A convenient expedient is to adjust the positions of the shield 70 and lamp 50, so that the portion of the rotating body illuminated is aligned with the center of mass of the rotating body and the geometric axis of the shaft 14.

The apparatus for determining the weights to be added or subtracted from the mass 16 in order to correct the condition of unbalance is a combination of the stroboscopic light assembly with an equipoise bar.

Depending from each arm 62 of each mounting head 22 is a shaft 78, the lower end of which engages a support bracket 80. Extending between the brackets 80 is an equipoise bar 82. Screws 84, threadedly engaging each bracket 80, bear against the equipoise bar 82 adjacent each end thereof to secure the equipoise bar to the brackets. The length of the shafts 78 is such that the equipoise bar is at the same level as the base 12.

It is apparent from the arrangement of parts that as the mounting heads 22 vibrate they execute limited rotary movement about a center located in the vibratory reeds 20. This produces a generally vertical oscillation of the arms 62 attached thereto such that the equipoise bar 82 will vibrate in substantially a vertically plane. The movement of the equipoise bar 82 will be proportional to the movement of the mounting heads 22.

Locking members 86 encircling the equipoise bar 82 are slidably attached to the base 12. A screw 88, threadedly engaging each locking member 86 is provided for pivotally securing the equipoise bar to the locking member. The equipoise bar 82 can thus be forced to pivot about any point intermediate the brackets 80. When the equipoise bar 82 is so pivoted, it follows that the mass 16 and the shaft 14 will be forced to pivot about a corresponding point intermediate the mounting heads 22.

In balancing the shaft 14 and the mass 16 for rotation about the geometric axis of the shaft 14, the locking members 86 are aligned for convenience with the ends of the mass 16. One locking member, say the left member in Figure 1, is locked to the equipoise bar 82 while the mass 16 and shaft 14 are rotated at a high speed. This forces the rotating shaft 14 and mass 16 to pivot about a point which is in substantial alignment with the locking member 86 on the left, or, in this case, a point located substantially at the left end of the mass 16. The mounting head 22 on the right will vibrate with a relatively large amplitude, the amplitude being dependent upon the amount of unbalance in the mass 16. If the switch 66 is positioned so that the light assembly is responsive to the contacts 52 and 54 on the right vibratory support and if the adjustment screw 64 is positioned so that the contacts 52 and 54 just barely make contact as the mounting head 22 vibrates, a stroboscopic effect will be created.

The amount of weight that must be added or removed from the right end of the mass 16 is correlated to the separation of the contacts 52 and 54 on the right vibratory support. The separation can readily be determined by calibrating the adjustment screw 64. A scale (not shown) encircling the head of each screw 64 may be provided for this purpose. The precise relationship between the contact separation and the required mass correction must be obtained experimentally for each type of body tested.

The angular position of the center of mass and, hence, the point at which weight is to be added to or removed from the mass 16, is determined by the portion of the mass 16 illuminated by the lamp 50 and is identified by noting the position of the helical mark 76 with reference to the graduated scale 74.

Without stopping the rotation of the shaft 14 and mass 16, the left locking member 86 is released and the right locking member 86 is tightened. The switch 66 is repositioned to place the contacts 52 and 54 of the left vibratory support 10 in the light assembly circuit. The measurements are then repeated.

The information thus obtained is (1) the angular position of the center of mass of the rotating body, (2) the weight to be added to or removed from the right end of the mass 16 and (3) the weight to be added to or removed from the left end of the mass 16. This is sufficient information to balance the combined shaft 14 and mass 16 for rotation about the geometric axis of the shaft 14.

It is apparent that one need not restrict the measurement to the ends of the mass 16. Measurements may be taken at any two pivotal points along the length of the mass 16, or even beyond the mass 16 on the shaft 14, provided (1) the center of mass lies between the two pivotal points and (2) the weight corrections are actually made at points in the cross sectional plane of each pivotal point. Greatest sensitivity results when the measurements are taken at pivotal points which are located as far as is practicable from the center of mass.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a dynamic balancing apparatus for balancing a rotatable mass, said apparatus including a pair of mounting heads each attached to a separate vibratory reed, each said mounting head being adapted to support one end of the rotatable mass, and means for rotating said mass upon said mounting heads such that an unbalance of the rotating mass will impart vibratory movement to the mounting heads, a pair of electrical contacts associated with each said mounting head, there being one contact supported by each said mounting head, means supporting the other contact of each said pair in spaced relation to the contacts carried by said mounting heads, means for measurably adjusting the separation between each pair of contacts such that contact between either pair is made only at an extreme of the vibratory movement of the associated mounting head whereby the amplitude of movement of the associated mounting head is ascertainable, a stroboscopic light assembly including a lamp positioned to illuminate a portion of the rotatable mass, switch means for selectively connecting said light assembly to said pairs of contacts whereby said light assembly responds selectively to either pair of contacts, and a shield positioned intermediate the rotatable mass and the light assembly, said shield having a longitudinal slot therein and a graduated scale adjacent said slot, said rotatable mass having a helical mark thereon, said helical mark having a pitch substantially equal to the length of the longitudinal slot in said shield.

2. In a dynamic balancing apparatus for balancing a rotatable mass, said apparatus including a pair of mounting heads, a vibratory reed supporting one of said mounting heads, each said mounting head being adapted to support one end of the rotatable mass, and means for rotating said mass upon said mounting heads such that an unbalance in the rotating mass will impart vibratory motion to the mounting head supported by said vibratory reed, electrical contact means adapted to be actuated by said vibratory mounting head, means for measurably adjusting said contact means for actuation by said vibratory head only at an extreme of the vibratory motion thereof whereby the amplitude of the vibratory movement of said mounting head is ascertainable, a stroboscopic light assembly responsive to actuation of said contact means positioned to illuminate a portion of said rotatable mass, and a shield positioned intermediate the rotatable mass and the light assembly, said shield having a longitudinal slot therein and a graduated scale adjacent said slot, said rotatable mass having a helical mark thereon, said helical mark having a pitch substantially equal to the length of the longitudinal slot in said shield.

References Cited in the file of this patent

UNITED STATES PATENTS

| | | |
|---|---|---|
| 1,552,982 | Bladner | Sept. 8, 1925 |
| 2,043,845 | Thearle | June 9, 1936 |
| 2,122,621 | Ohly | July 5, 1938 |
| 2,186,339 | Moore | Jan. 9, 1940 |
| 2,196,031 | Schildmeier | Apr. 2, 1940 |
| 2,361,281 | Gibbs | Oct. 24, 1944 |
| 2,382,843 | Annis | Aug. 14, 1945 |
| 2,656,710 | Weaver | Oct. 27, 1953 |
| 2,754,686 | Phelps | July 17, 1956 |
| 2,811,853 | Friedman | Nov. 5, 1957 |